United States Patent
Lunadei et al.

(10) Patent No.: US 9,590,229 B2
(45) Date of Patent: Mar. 7, 2017

(54) DEVICE FOR LOADING A POWDERED WATER-FREE ELECTROLYTE

(71) Applicant: WHITEHEAD SISTEMI SUBACQUEI S.p.A., Piazza Monte Grappa (IT)

(72) Inventors: Alessandro Lunadei, Livorno (IT); Marco Marzocchi, Livorno (IT)

(73) Assignee: WHITEHEAD SISTEMI SUBACQUEI S.P.A., Rome (IT)

( * ) Notice: Subject to any disclaimer, the term of this patent is extended or adjusted under 35 U.S.C. 154(b) by 99 days.

(21) Appl. No.: 14/562,109

(22) Filed: Dec. 5, 2014

(65) Prior Publication Data

US 2015/0162595 A1 Jun. 11, 2015

(30) Foreign Application Priority Data

Dec. 6, 2013 (IT) .............................. TO2013A1002

(51) Int. Cl.
*H01M 2/36* (2006.01)
*H01M 6/34* (2006.01)

(52) U.S. Cl.
CPC ............. *H01M 2/362* (2013.01); *H01M 6/34* (2013.01)

(58) Field of Classification Search
CPC .......... H01M 2/362; H01M 6/34; B67D 3/00; B67D 3/0019; B67D 3/0029; B67D 3/0032; G03G 15/0832
USPC ................. 141/287, 302, 346–351, 363–366
See application file for complete search history.

(56) References Cited

U.S. PATENT DOCUMENTS

| | | | | |
|---|---|---|---|---|
| 3,123,107 A | * | 3/1964 | Kappler | B65D 90/626 141/284 |
| 4,325,419 A | * | 4/1982 | Gubitose | B65B 1/04 137/614.17 |
| 5,125,438 A | * | 6/1992 | McCunn | A01C 15/006 137/614.04 |
| 5,299,606 A | * | 4/1994 | Schrupp | B67D 7/74 134/166 R |

(Continued)

FOREIGN PATENT DOCUMENTS

EP   0901833   3/1999

OTHER PUBLICATIONS

Italian Search Report dated Aug. 26, 2014 corresponding to Italian Application No. ITT020131002; 7 pages.

*Primary Examiner* — Timothy L Maust
(74) *Attorney, Agent, or Firm* — Ohlandt, Greeley, Ruggiero & Perle, LLP

(57) ABSTRACT

An apparatus for loading a powdered electrolyte into a chamber made in a tubular casing of a craft operating in an underwater environment, comprising: a valve carried by the tubular casing, configured to be arranged in a normally closed position and designed to be moved, as a result of manual operation, to an open position to allow the introduction of the powdered electrolyte into the chamber from outside the casing; a feeder-actuator assembly configured to be mounted on the tubular casing to couple with the valve in a fluid-tight manner and enable the opening/closing of the valve; and an electrolyte tank configured to couple with the feeder-actuator assembly and feed powdered electrolyte by gravity to the actuator assembly. The actuator assembly delimits an elongated internal cavity configured to allow a flow of powdered electrolyte from the tank to the chamber through the valve.

14 Claims, 5 Drawing Sheets

(56) References Cited

U.S. PATENT DOCUMENTS

| | | | |
|---|---|---|---|
| 5,476,574 A | 12/1995 | Welch | |
| 5,752,788 A | 5/1998 | Crum | |
| 5,832,973 A * | 11/1998 | Goldschmidt | C12M 29/00 |
| | | | 141/364 |
| 5,937,920 A * | 8/1999 | Simmel | B65B 1/06 |
| | | | 141/346 |
| 6,050,309 A * | 4/2000 | Woodruff | A01M 7/0092 |
| | | | 141/346 |
| 6,170,543 B1 * | 1/2001 | Simmel | B67D 7/0294 |
| | | | 141/346 |
| 6,666,237 B2 * | 12/2003 | De Antoni Migliorati | B65B 39/005 |
| | | | 141/286 |
| 8,561,652 B2 * | 10/2013 | Bordere | B65B 1/28 |
| | | | 137/614 |

* cited by examiner

DEVICE FOR LOADING A POWDERED WATER-FREE ELECTROLYTE

The present invention relates to an apparatus for loading a dry (anhydrous) powdered electrolyte into a cavity made in a tubular casing of a craft operating in an underwater environment.

BACKGROUND OF THE INVENTION

Submarine craft, such as torpedoes, probes and remote-controlled submarines, comprise a tubular casing elongated along a longitudinal axis and designed to move under the thrust of a propulsion system housed in a rear potion of the casing and powered by a source of electrical energy, also housed inside the casing.

The source of electrical energy is typically provided by an electrochemical battery that is capable of supplying high currents to provide an opportune power supply for the electric motors that power the craft.

In particular, electrochemical batteries (for example, see patent application PCT WO2005/053068, which describes an electrochemical battery) comprise:
- a main electric battery of the electrochemical type, in which a casing defines a main chamber containing a dry electrolyte (for example, sodium hydroxide or potassium hydroxide) and is provided with means for the controlled admission of a flow of water from the underwater environment, to form a liquid electrolyte upon operation a water admission control, and means for discharging effluent into the underwater environment, typically gases produced by the chemical reaction of the main battery; the main chamber houses a liquid electrolyte recirculation system (using an electric pump) feeding a plurality of electrochemical cells housed in the main chamber;
- an auxiliary electric battery that can be activated by remote control for opening the means of controlled admission and supplying power to the electric pump in order to achieve the formation and recirculation of the electrolyte.

The recirculation system commonly comprises a thermostatic mixer valve that enables adjusting the flow of the liquid electrolyte supplied to the electrochemical cells in order to keep the temperature of the electrolyte equal to a target value. This thermostatic valve, generally three-way, has a first inlet that receives electrolyte directly front the main chamber, a second inlet that communicates with the outlet of a heat exchanger to which the electrolyte present in the main chamber is fed and an outlet communicating with an inlet of the electrochemical cells.

In known electrochemical batteries, such as those described patent application PCT WO2005/053068, the loading of the dry powdered electrolyte is carried out during the assembly of the parts that delimit the main chamber.

However, in many operating situations it would be convenient and/or advantageous to load the dry powdered electrolyte in a subsequent assembly phase of the craft.

The need is therefore felt to provide an apparatus that enables loading the dry electrolyte inside the main chamber.

SUMMARY OF THE INVENTION

The above aim is achieved by the present invention in so far as it relates to an apparatus for loading a powdered electrolyte into a chamber made in a tubular casing of a craft operating in an underwater environment, characterized in that it comprises: a valve carried by the tubular casing, configured to be arranged in a normally closed position and designed to be moved, as a result of manual operation, to an open position to allow the introduction of the powdered electrolyte into the chamber from outside the casing; a feeder-actuator assembly configured to be mounted on the tubular casing to couple with the valve in a fluid-tight manner and enable the opening/closing of the valve as a result of said manual operation; and an electrolyte tank configured to couple with the feeder-actuator assembly and feed powdered electrolyte by gravity to the actuator assembly;

said actuator assembly delimiting an elongated inner cavity configured to allow a flow of powdered electrolyte from the tank to the chamber through the valve kept open by the feeder-actuator assembly.

Preferably, said valve comprises a shutter designed to close/make accessible an inner pipe of said valve; said shutter being carried by a first end of a first, stem moveable in an axial direction between a rest position, in which the valve is closed, and an activated position, in which the inner pipe is accessible;

said feeder-actuator assembly comprising a second stem axially moveable as a result of said manual operation and having an end portion facing said valve;

said second stem is moveable between a retracted position, in which it faces the second position of the first stem, and an extracted position, in which the second stem presses on the second end portion of the first stem, producing the displacement of the shutter and the opening of said valve.

BRIEF DESCRIPTION OF THE DRAWINGS

The invention will now be described with particular reference to the accompanying drawings, which represent a preferred embodiment, in which.

DETAILED DESCRIPTION OF THE INVENTION

Figure 1:
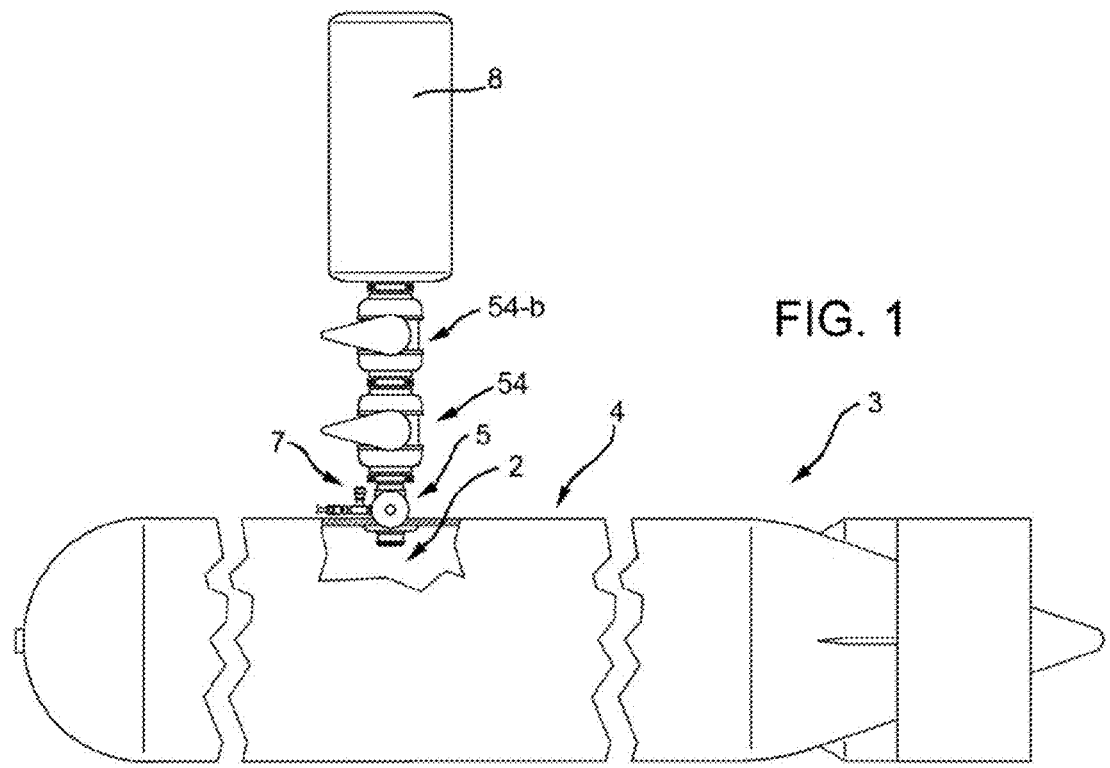
FIG. 1 shows a usage example of an apparatus for loading a dry powdered electrolyte inside a cavity made in a tubular casing of a craft operating in an underwater environment made according to the principles of the present invention.

In the accompanying figures, reference numeral 1 indicates, as a whole, an apparatus for loading a dry powdered electrolyte (for example, sodium hydroxide or potassium hydroxide) inside a chamber 2 made in a tubular casing 4 of a craft 3 (FIG. 1) operating in an underwater environment. The example of embodiment shown refers to a torpedo having a cylindrical chamber 2 inside a cylindrical tubular casing 4; however, it is clear that the craft 3 could be of a different type, for example a remote-controlled probe or a mini-submarine operating in an underwater environment, and that the shape of the casing 4 and the chamber 2 could be different.

The craft 3 is propelled by an electric battery of (a known) electrochemical type in which the chamber 2 is designed to house dry electrolyte and is provided with means for the controlled admission of a flow of water from the marine environment, to form a liquid electrolyte upon operation a water admission control, and means for discharging effluent into the marine environment, typically gases produced by the chemical reaction of the battery. The chamber 2 houses a liquid electrolyte recirculation system (using an electric pump) feeding a plurality of electrochemical cells housed in the chamber 2. Usually, an auxiliary electric battery that can be activated by remote control is used for opening the means of controlled admission and supplying power to the electric pump in order to achieve the formation and recirculation of the electrolyte.

The apparatus 1 comprises:
- a valve 5 of the normally closed type fitted on the tubular casing 4 and configured to allow, when open, introduction of the dry powdered electrolyte into the chamber 2 from outside the casing 4;
- a feeder-actuator assembly 7 designed to be mounted on the tubular casing 4 to couple with the valve 5 in a fluid-tight manner and enable the opening/closing of the valve 5 as a result of manual operation; and
- an electrolyte tank 8 (FIGS. 1, 2 and 3) configured to couple with the feeder-actuator assembly 7 and feed powdered electrolyte by gravity to the actuator assembly 7.

As will be described in detail hereinafter, the actuator assembly 7 is completely hollow and is designed to allow, in an operating condition that will be described in detail further on, a flow of powdered electrolyte from the tank 8 to the chamber 2 through the valve 5 kept open by the feeder-actuator assembly.

Figure 4:
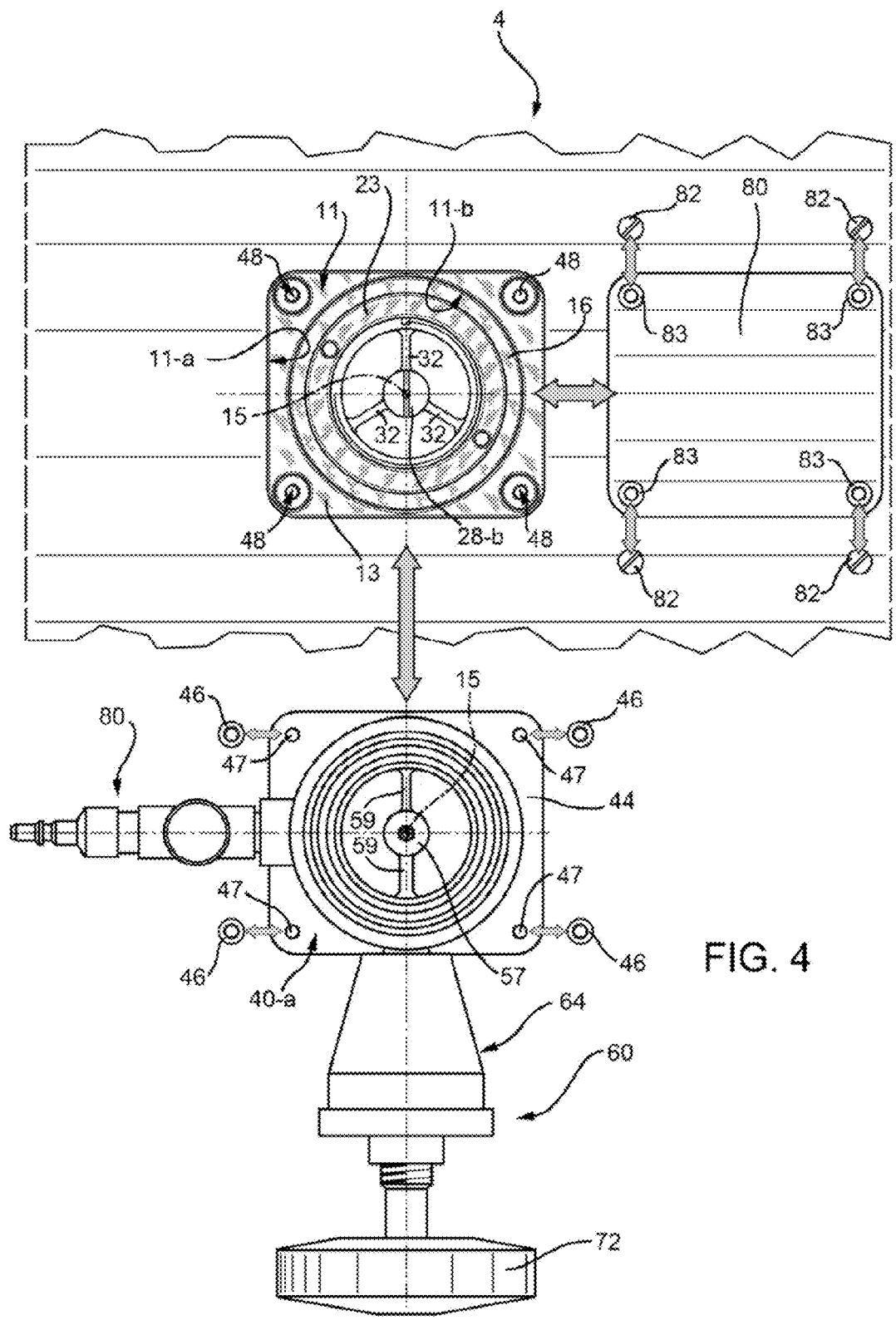
FIG. 4 is a top view of the apparatus in FIG. 3.
Figure 6:
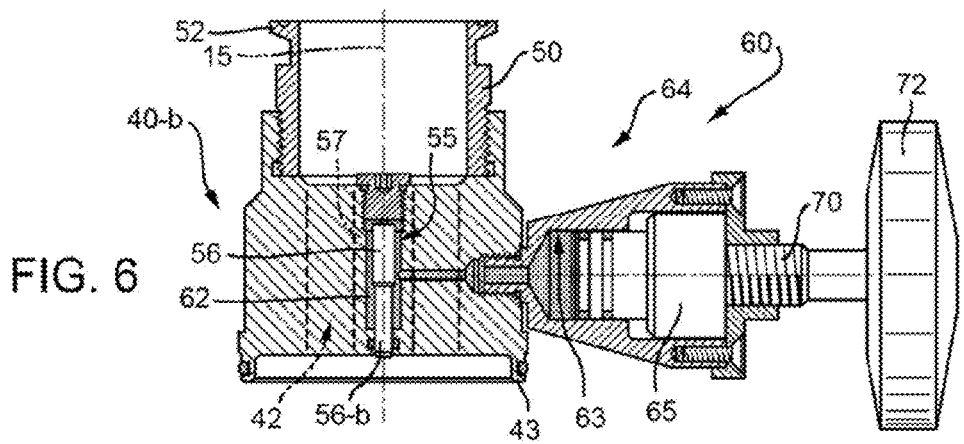
FIG. 6 is a cross-section of the component shown in FIG. 5 along plane A-A in FIG. 5.
Figure 7:
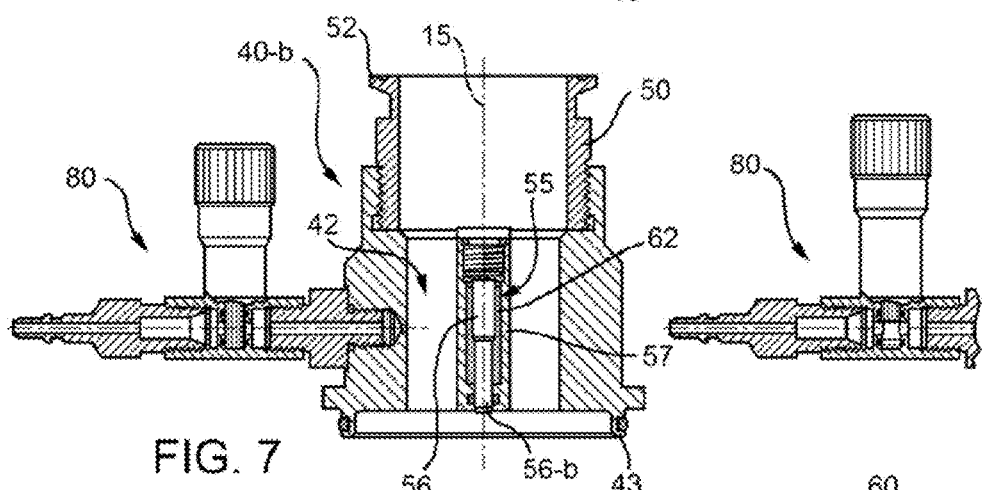
FIG. 7 is a cross-section of the component shown in FIG. 5 along plane B-B in FIG. 5.

In greater detail, the valve 5 is housed in a lowered seat 11 (FIG. 4) of the casing 4, which comprises a first lowered portion 11-$a$, which has a parallelepipedal shape, communicates with the outside of the tubular casing 4 and is delimited at the bottom by a flat wall 13 on which a second lowered portion 11-$b$ opens, which has a cylindrical shape coaxial with an axis 15 and is delimited at the bottom by a flat wall 16 perpendicular to axis 15.

Figure 5:
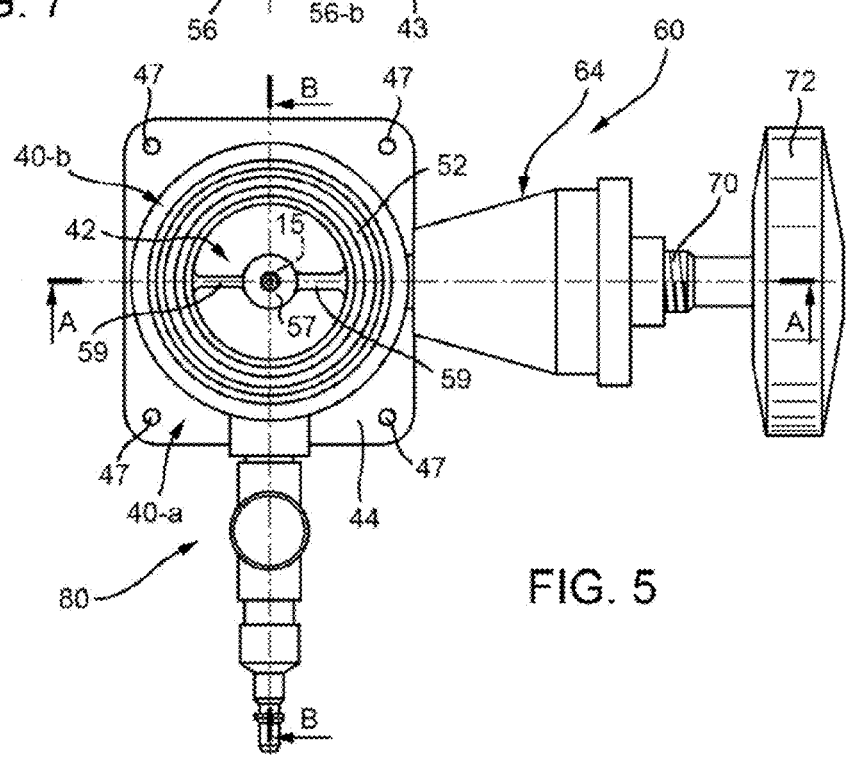
FIG. 5 shows a top view of a component (actuator assembly) of the apparatus in FIG. 3.
Figure 9:
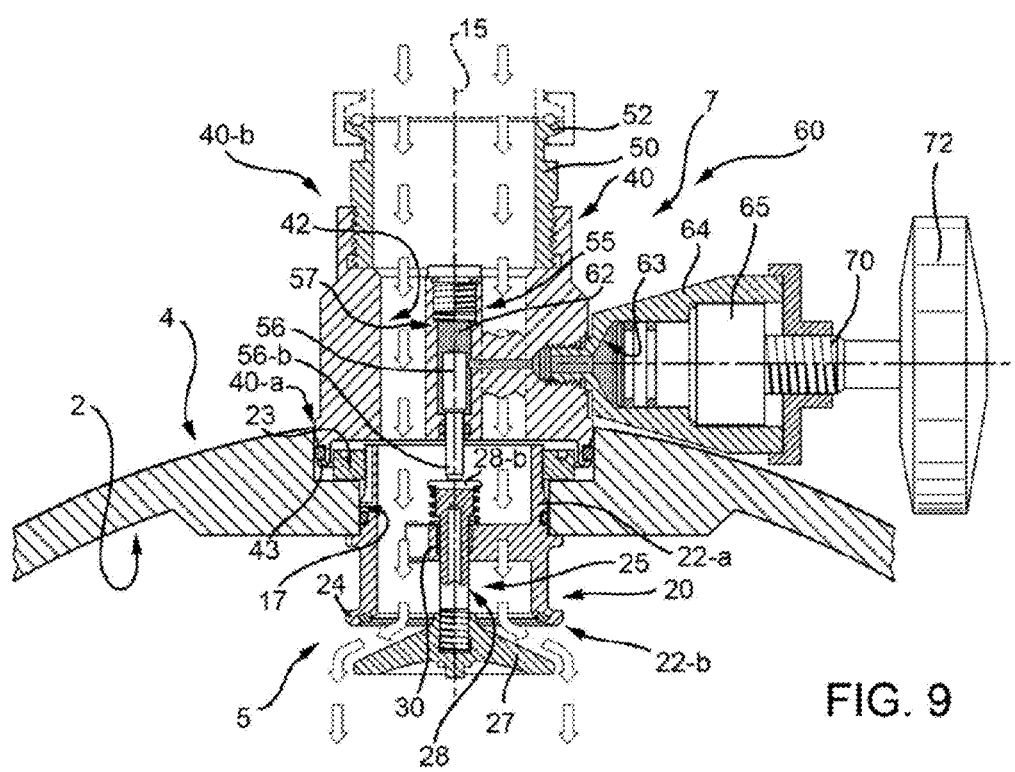
FIG. 9 shows a cross-section of the apparatus for loading a powdered electrolyte represented in a second operating position (open).

There is a through opening 11 in flat wall 16, (FIGS. 5 and 9) that has a circular shape coaxial with axis 15 and places the lowered portion 11 in communication with the inner chamber 2.

Figure 8:
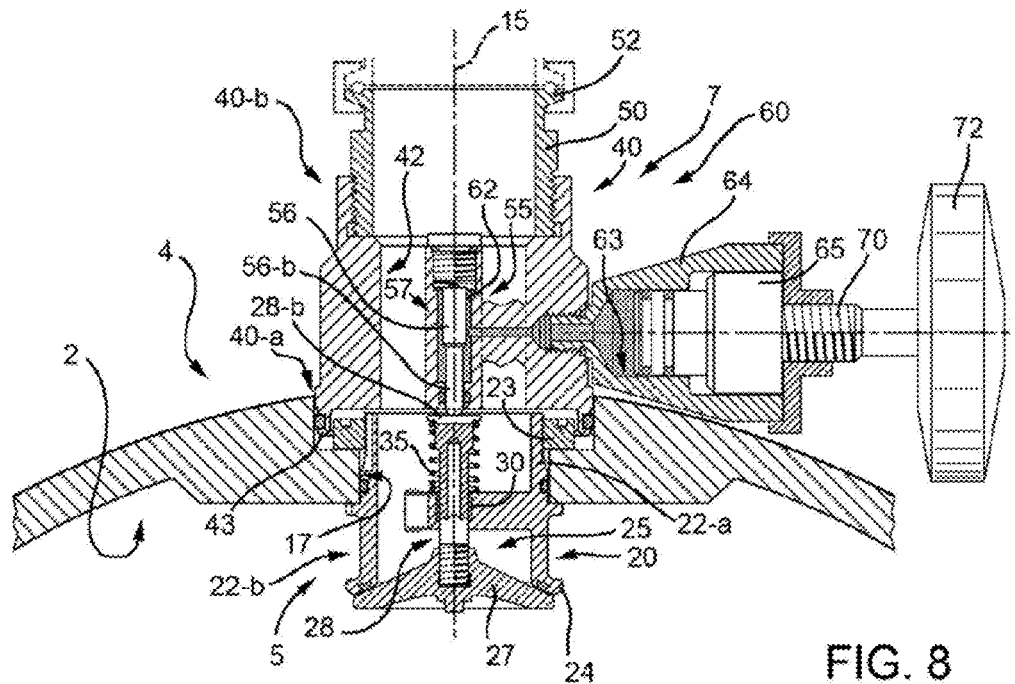
FIG. 8 shows a cross-section of the apparatus for loading a powdered electrolyte represented in a first operating position (closed)

The valve 5 comprises a cylindrical tubular body 20 (FIGS. 8 and 9) that has a first end portion 22-$a$ which is screwed into the through opening 17 and partially protrudes from flat wall 16. The portion that protrudes from wall 16 is threaded and carries a ring 23 coaxial with axis 15 and abutting against wall 16.

The cylindrical tubular body 20 has a second end portion 22-$b$ that is arrange inside the chamber 2 and terminates with a flared lip 24, fitted with a washer and facing outwardly from the tubular body 20.

The valve 5 also comprises a shutter device 25 movable between a rest position (FIGS. 3 and 8), in which a cup-shaped body 27 is placed in contact with the washer of the lip 24 and closes the tubular body 20, and an activated position, in which the cup-shaped body 27 separates from the lip 24 (FIG. 9) and enables a flow of dry powdered electrolyte (indicated by the arrows) through the tubular body 20 to the chamber 2.

The valve 5 comprises a stem 23 that carries a cup-shaped body 27 at a first end thereof and is movable with reversible motion inside the tubular body 20 along axis 15 as a result of manual operation.

The stem 28 is carried by a bushing 30 arranged inside the tubular body 20 coaxial with axis 15 and carried by a number of rectilinear appendages 32 (FIG. 4), three for example, which extend radially (FIG. 4) from an inner surface of the tubular body 20 to the bushing 30. The space between the appendages 32 delimits openings for the passage of the powdered electrolyte through the tubular body 20.

The stem 28 carries an elastic device formed by a helical spring 35 (FIGS. 8 and 9) mounted coaxially with the stem 28 and provided with a first end that abuts against the bushing 30 and a second end that abuts against a second end 28-$b$ of the stem 28. The helical spring 35 is designed to move the second end portion 28-$b$ to a position away from the bushing 30 so that the cup-shaped body 27 abuts against the lip 24 to create a valve 5 of the normally closed type. The application of a force on the second end portion 28-$b$ directed in the axial direction towards the bushing 30 produces compression of the spring 35 and the consequent separation of the cap-shaped body 27 from the lip 24 (opening of the valve 5).

The actuator assembly 7 comprises a tubular element 40 delimiting an axial cavity 42 that extends coaxially along axis 15.

The tubular element 40 has a first end portion 40-$a$ that is shaped so that it can couple in a fluid-tight manner with the valve 5; in particular, end portion 40-$a$ is provided with an annular appendage 43, which is coaxial with axis 15 and has an inner diameter substantially equal to the outer diameter of the ring 23 on which it is designed to be placed when the feeder-actuator assembly 7 is coupled to the valve 5.

The end portion 40-$a$ is also provided with a flat end flange 44 (FIG. 4) perpendicular to axis 15, having a square-shaped perimeter and designed to be mounted on first lowered portion 11-$a$ that abuts against wall 13 to make a stable connection between the feeder-actuator assembly 7 and the casing 4.

The stable connection between the flange 44 and the tubular casing 4 is obtained via four screws 46 that engage respective through holes 47 of wall 44 and screw into blind holes 48 made near the corners of the flat wall 13.

The tubular element 40 has a second end portion 40-$b$ that carries a tubular sleeve 50 coaxial with axis 15 and provided at its free end with an annular coupling flange 52 that extends outwardly from the sleeve 50.

The annular coupling flange 52 is used for connection to a valve 54 (of known type—in particular, a ball valve) that can be connected to a valve 54-$b$ that has the same structure as valve 54 and extends from the tank 8 (FIG. 1). When the valves 54 and 54-$b$ are both open, they enable the flow of powdered electrolyte from the tank 8 to the axial cavity 42.

In this way, when the feeder-actuator assembly 7 is mounted on the casing 4 (FIG. 3), the tank 8 is arranged in a position above that of the valves 54 and 54-$b$, the feeder-actuator assembly 7 and valve 5. The structure formed by the feeder-actuator assembly 7 (connected to the casing 4) and the valves 54 and 54-$b$ (connected on one side to the feeder-actuator assembly 7 and on the other side to the tank 8) supports and bears the weight of the tank 8.

The feeder-actuator assembly is equipped with a moveable member 55, axially movable along axis 15 as a result of manual operation and used to perform the opening of the valve 5.

The moveable member 55 comprises a second stem 56 carried by a bushing 57 arranged inside the tubular element 40, coaxial with axis 15 and carried by a plurality of rectilinear appendages 59 (FIG. 4), two for example, which extend radially (FIG. 4) from an inner surface of the tubular element 40 to the bushing 57. The space between the appendages 59 delimits openings for the passage of the powdered electrolyte through the tubular element 40.

Stem 56 has an end portion 56-*b* that is designed to face portion 28-*b* of stem 28 when the feeder-actuator assembly is mounted on the casing 4 and is coupled to valve 5. Stem 56 is movable, under the action of a hydraulic actuation system 60 of known type, between a retracted position (FIG. 8) in which it faces portion 28-*b* of stem 28 and an extracted position (FIG. 9) in which it presses on stem 28 causing the displacement of the latter and the opening of the valve 5.

The hydraulic system 60 comprises a first chamber 62, which is made in the bushing 57 and houses a second end portion of stem 56, and a second chamber 63 communicating with the first chamber 62 and used to feed pressurized oil to the first chamber 62 to obtain the displacement of stem 56.

The second chamber 63 is made with a truncated-cone-shaped body 64 that extends radially from the tubular element 40 and is equipped with a piston 65 designed to move inside chamber 63 to apply pressure to the oil. The movement of the piston 65 is performed via a screw and nut operated system, in which a threaded member 70 screwed into a threaded opening of the body 64 has a first end inside the body 64 that abuts against the piston 65 and a second end arranged outside the body 64 provided with a manually operable control knob 72.

The feeder-actuator assembly 7 is equipped with a valve 80 (FIGS. 3 and 4) communicating with the axial cavity 42.

Valve 80 (of known type and therefore not described in further detail) is configured to provide connection to a suction and injection system (not shown) designed to suck out gas present in the cavity 4 and inject nitrogen for storing the dry electrolyte, once loaded, when valve 5 is open.

Figure 2:
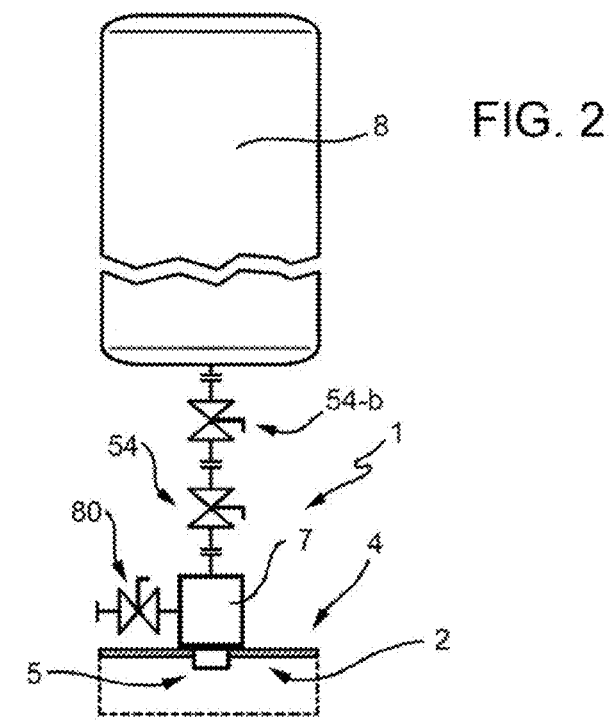
FIG. 2 is an equivalent hydraulic diagram of the apparatus in FIG. 1.
Figure 3:
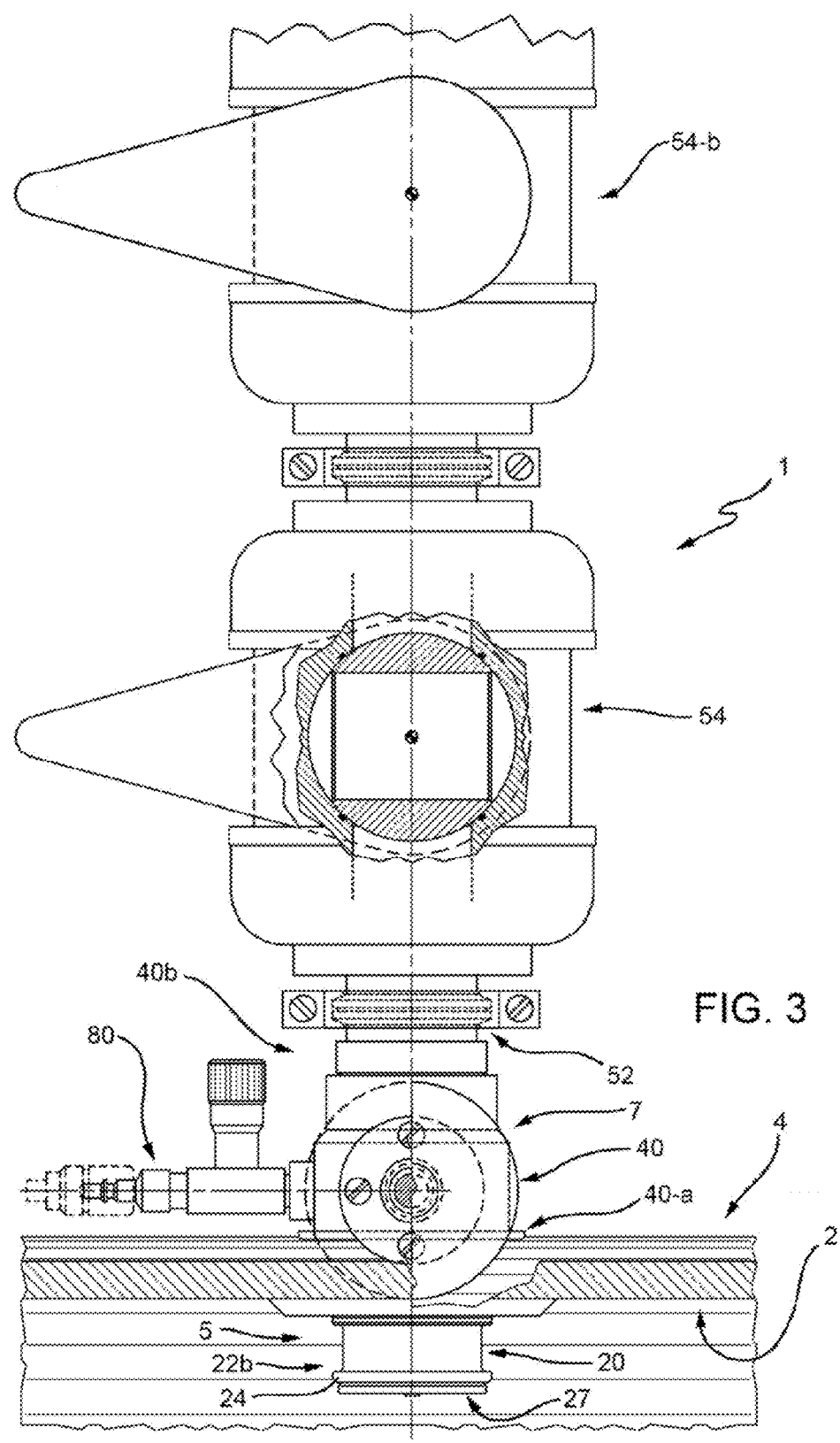
FIG. 3 shows, in a lateral view and partially in section, an apparatus for loading a dry powdered electrolyte inside a cavity made in a tubular casing of a craft operating in an underwater environment made according to the principles of the present invention.

In use, the tank 8 is filled via its valve 54-*b* (as mentioned, normally implemented as a ball valve and, for simplicity, only shown in FIGS. 1, 2 and 3) with a dry powdered electrolyte; these filling operations take place in an inert atmosphere (generally nitrogen).

Valve 54-*b* is closed at the end of the filling operations.

Subsequently, the feeder-actuator assembly 7 is mounted on the casing 4 and securely fastened thereto by screws 46. Valve 5 is closed.

Valve 54 is then fastened on the tubular sleeve 50 by using the coupling flange 52 and a clamping device of known type. Valve 80 is connected to a vacuum source.

Subsequently, valves 54 and 54-*b* are connected together, forming the structure in FIG. 2, in which valves 54-*b*, 54 and 5 are interposed between the tank 8 and the chamber 2.

Valves 80, 5, 54 and 54-*b* are initially closed.

The control knob 72 is turned clockwise; this operation causes the opening of valve 5 according to the foregoing.

Subsequently, valves 80 and 54 are opened and air suction activated to create a vacuum inside chamber 2.

After the air has been extracted, nitrogen is pumped (through valve 80) into the chamber 2 until ambient pressure is reached; valve 80 is then closed.

Valve 54-*b* is opened to allow the dry electrolyte to fall by gravity through valves 54 and 5 and thus enter the chamber 2.

Upon terminating transfer of all the electrolyte in the tank 8 (the tank 8 is translucent so that the level of the powdered electrolyte inside it can be seen), valve 54-*b* is closed.

Valve 54 is also closed and the control knob 72 is turned anticlockwise; this operation causes the closure of valve 5 according to the foregoing.

The tank is then uncoupled from the feeder-actuator assembly 7, which is also disconnected from the casing 4 (the screws 46 are removed).

At the end of these operations, the lowered seat is closed by a shaped hatch 80 (FIG. 4) using screws 82 that engage holes 83 in the hatch 80 for a first length and the seats 48 for a second length.

The invention claimed is:

1. An apparatus for loading a powdered electrolyte into a chamber made in a tubular casing of a craft operating in an underwater environment, the apparatus comprising:
    a valve adapted to be carried by the tubular casing the valve being configured to be arranged in a normally closed position and designed to be moved, as a result of manual operation, to an open position to allow the introduction of the powdered electrolyte into the chamber from outside the tubular casing;
    a feeder-actuator assembly configured to be mounted on the tubular casing to couple with the valve in a fluid-tight manner and enable the opening/closing of the valve as a result of said manual operation; and
    an electrolyte tank configured to couple with the feeder-actuator assembly and feed powdered electrolyte by gravity to the feeder-actuator assembly;
    said feeder-actuator actuator assembly delimiting an elongated internal cavity configured to allow a flow of powdered electrolyte from the electrolyte tank to the chamber through the valve kept open by the feeder-actuator assembly,
    wherein said valve comprises a shutter designed to close/make accessible an inner pipe of said valve, said shutter being carried by a first end of a first stem moveable in an axial direction between a rest position, in which the valve is closed, and an activated position, in which the inner pipe is accessible, said feeder-actuator assembly comprising a second stem axially moveable as a result of said manual operation and having an end portion facing said valve, said second stem is moveable between a retracted position, in which it faces a second end portion of the first stem and an extracted position, in which the second stem presses on the second end portion of the first stem, producing the displacement of the shutter and the opening of said valve.

2. An apparatus according to claim 1, wherein the valve comprises a cylindrical tubular body, which has a first end portion that is adapted to pass through said tubular casing to which it is fixed and partially protrudes from the casing to form a connection ring configured to couple to an end portion of the feeder-actuator assembly.

3. An apparatus according to claim 2, wherein said cylindrical tubular body has a second end portion that is arranged within the chamber and terminates in an end portion that can be closed by said shutter.

4. An apparatus according to claim 3, wherein said second end portion of the cylindrical tubular body terminates with a flared lip facing outwards from the tubular body and a shutter device comprises a cup-shaped body designed to make contact with said flared lip and thereby close the tubular body in said closed position, and wherein said cup-shaped body separates from the flared lip in said open position to enable a flow of powdered electrolyte through the tubular body towards the chamber.

5. An apparatus according to claim 2, wherein said first stem is carried by a bushing arranged inside the tubular body and carried by rectilinear appendages that extend radially from an inner surface of the tubular body towards the bushing and space between the rectilinear appendages delimits openings for the passage of the powdered electrolyte through the tubular body.

6. An apparatus according to claim 5, wherein said first stem carries an elastic device formed by a helical spring mounted coaxially to the first stem and provided with a first end that abuts against the bushing and a second end that abuts against said second end of the first stem, and wherein said helical spring is designed to move the second end portion to a position away from the bushing so that said shutter closes said valve.

7. An apparatus according to claim 1, wherein said feeder-actuator assembly comprises a tubular element delimiting an elongated inner cavity, wherein said second stem being is carried by a bushing arranged within the tubular element and carried by appendages that extend radially from an inner surface of the tubular element towards the bushing and space between the appendages delimits openings for the passage of the powdered electrolyte through the tubular element.

8. An apparatus according to claim 1, wherein said feeder-actuator assembly comprises a tubular element delimiting an elongated inner cavity, wherein the tubular element has a first end portion, which is shaped so that it can couple in a fluid-tight manner with the valve and be arranged stably on said tubular casing.

9. An apparatus according to claim 8, wherein said first end portion is provided with an annular appendage communicating with said elongated inner cavity, and wherein said annular appendage has an inner diameter substantially equal to an outer diameter of an annular connection portion of said valve on which it is designed to be placed.

10. An apparatus according to claim 8, wherein said first end portion is provided with a flat end flange designed to be stably fastened to a lowered portion of the tubular casing to make a stable connection between the feeder-actuator assembly and the tubular casing.

11. An apparatus according to claim 1, wherein the second stem is moveable under the action of a hydraulic actuation system incorporated in the feeder-actuator assembly.

12. An apparatus according to claim 11, wherein the hydraulic actuation system comprises a first chamber, which is made in a bushing that supports the second stem and houses a second end portion of the second stem, and wherein said hydraulic actuation system comprises a second chamber communicating with the first chamber and used to feed pressurized oil to the first chamber to obtain the displacement of the second stem with respect to the bushing that supports the second stem.

13. An apparatus according to claim 12, wherein the second chamber houses a piston designed to move within the second chamber under the action of a screw and nut operated system, in which a threaded member screwed into a threaded opening of a body, which delimits the second chamber, has a first end inside the body and abutting against the piston, and a second end arranged outside the body provided with a manually operable control knob.

14. An apparatus for loading a powdered electrolyte into a chamber made in a tubular casing of a craft operating in an underwater environment, the apparatus comprising:

a valve adapted to be carried by the tubular casing, the valve being arranged in a normally closed position and designed to be moved, as a result of manual operation, to an open position to allow the introduction of the powdered electrolyte into the chamber from outside the tubular casing;

a feeder-actuator assembly mounted on the tubular casing to couple with the valve in a fluid-tight manner and enable the opening/closing of the valve as a result of said manual operation; and an electrolyte tank to couple with the feeder-actuator assembly and feed powered electrolyte by gravity to the feeder-actuator assembly;

said feeder-actuator actuator assembly delimiting an elongated internal cavity configured to allow a flow of powdered electrolyte from the electrolyte tank to the chamber through the valve kept open by the feeder-actuator assembly, wherein said valve is a first valve, and wherein said feeder-actuator assembly is provided with a second valve communicating with said inner cavity, and wherein said second valve is configured to provide connection to a suction and injection system designed to suck out gas present in said cavity and inject nitrogen, when said first valve is open.

* * * * *